United States Patent
Gantzer et al.

(10) Patent No.: US 9,198,357 B2
(45) Date of Patent: Dec. 1, 2015

(54) PICK-UP DEVICE WITH ARTICULATED PICK-UP UNITS AND AGRICULTURAL MACHINE EQUIPPED WITH SUCH A DEVICE

(75) Inventors: Christian Gantzer, Woustwiller (FR); Jean-Pierre Petain, Westhoffen (FR)

(73) Assignee: KUHN S.A., Saverne (FR)

( * ) Notice: Subject to any disclaimer, the term of this patent is extended or adjusted under 35 U.S.C. 154(b) by 61 days.

(21) Appl. No.: 14/232,484

(22) PCT Filed: Jul. 9, 2012

(86) PCT No.: PCT/FR2012/051614
§ 371 (c)(1),
(2), (4) Date: Jan. 13, 2014

(87) PCT Pub. No.: WO2013/007939
PCT Pub. Date: Jan. 17, 2013

(65) Prior Publication Data
US 2014/0150396 A1 Jun. 5, 2014

(30) Foreign Application Priority Data
Jul. 13, 2011 (FR) ................................. 11 56367

(51) Int. Cl.
*A01D 76/00* (2006.01)
*A01D 78/00* (2006.01)
(Continued)

(52) U.S. Cl.
CPC .............. *A01D 89/002* (2013.01); *A01D 84/00* (2013.01); *A01D 89/004* (2013.01)

(58) Field of Classification Search
CPC ...... A01B 73/02; A01B 73/04; A01D 41/144; A01D 80/005; Y10S 56/21
USPC ................................................... 56/379, 15.2
See application file for complete search history.

(56) References Cited

U.S. PATENT DOCUMENTS 3,345,808 A * 10/1967 Van Der Lely ............ 56/10.2 R
4,409,780 A * 10/1983 Beougher et al. .............. 56/228
(Continued)

FOREIGN PATENT DOCUMENTS

EP         0 715 804         6/1996
EP         0 755 621         1/1997
(Continued)

OTHER PUBLICATIONS

International Search Report Issued Oct. 2, 2012 in PCT/FR12/051614 Filed Jul. 9, 2012.
(Continued)

*Primary Examiner* — Arpád Fábián-Kovács
(74) *Attorney, Agent, or Firm* — Oblon, McClelland, Maier & Neustadt, L.L.P.

(57) ABSTRACT

A pick-up device, usable by an agricultural machine, includes a frame and first and second units. The first and second units each include a displacement device, are arranged beside each other and a small distance apart, are connected directly to the frame by respective first and second articulations having first and second distinct axes directed in a direction of advance, include respective first and second pick-up rotors rotatable about third and fourth axes, and are connected to one another by a guidance device. The first and third axes are in a same seventh plane, the second and fourth axes are in a same eighth plane. A stop mechanism defines two work end positions of the first and second units with respect to the frame, between which they can pivot freely within a limited range, and remain connected to one another regardless of their position between the work end positions.

22 Claims, 9 Drawing Sheets

(51) Int. Cl.
*A01D 80/00* (2006.01)
*A01D 84/00* (2006.01)
*A01D 89/00* (2006.01)

(56) References Cited

U.S. PATENT DOCUMENTS

| | | | | |
|---|---|---|---|---|
| 4,487,004 | A * | 12/1984 | Kejr | 56/14.4 |
| 7,310,929 | B2 * | 12/2007 | Dow et al. | 56/192 |
| 7,823,371 | B2 | 11/2010 | Gantzer et al. | |
| 8,091,331 | B2 * | 1/2012 | Dow et al. | 56/192 |
| 2002/0035826 | A1 * | 3/2002 | Albinger et al. | 56/109 |
| 2003/0182912 | A1 * | 10/2003 | Boll | 56/14.7 |
| 2003/0226342 | A1 * | 12/2003 | Boeckmann et al. | 56/14.7 |
| 2004/0123575 | A1 * | 7/2004 | Rickert | 56/14.7 |
| 2006/0248870 | A1 * | 11/2006 | Geiser | 56/344 |
| 2006/0254244 | A1 * | 11/2006 | Geiser | 56/370 |
| 2007/0204583 | A1 * | 9/2007 | Coers | 56/14.4 |
| 2008/0295473 | A1 * | 12/2008 | Tippery et al. | 56/14.5 |
| 2010/0037584 | A1 | 2/2010 | Dow et al. | |
| 2011/0030326 | A1 * | 2/2011 | Markt | 56/14.5 |
| 2011/0094200 | A1 | 4/2011 | Dow et al. | |
| 2011/0094202 | A1 | 4/2011 | Dow et al. | |

FOREIGN PATENT DOCUMENTS

| | | |
|---|---|---|
| FR | 2 868 905 | 10/2005 |
| FR | 2 908 588 | 5/2008 |

OTHER PUBLICATIONS

U.S. Appl. No. 14/098,869, filed Dec. 6, 2013, Gantzer.
U.S. Appl. No. 14/107,385, filed Dec. 16, 2013, Gantzer.

* cited by examiner

PICK-UP DEVICE WITH ARTICULATED PICK-UP UNITS AND AGRICULTURAL MACHINE EQUIPPED WITH SUCH A DEVICE

The present invention relates to a pick-up device comprising tools for raking and picking up products lying on the ground and which is intended to be mounted on a support framework of an agricultural machine, the pick-up device comprising a rigid frame, a first work unit and a second work unit, each of the first and second work units comprising a displacement device for moving the picked up products, the first and second work units being arranged one beside the other when viewed in the direction of advance and at a small distance from one another other in a direction substantially perpendicular to the direction of advance, the first work unit being connected directly to the frame by a first articulation having a first axis directed substantially in the direction of advance, the second work unit being connected directly to the frame by a second articulation having a second axis directed substantially in the direction of advance and being distinct from the first axis, the first work unit comprising a first pick-up rotor which can rotate about a third axis, the second work unit comprising a second pick-up rotor which can rotate about a fourth axis, the first work unit and the second work unit being connected to one another by a guidance means.

Such a pick-up device is known from the document EP 0 755 621 A1. This describes a machine for picking up products lying on the ground, having a frame designed to be hitched to a motor vehicle. The frame carries two work units, each comprising a pick-up rotor equipped with raking tools. On this machine, the first articulation is arranged at some distance above the first work unit and towards the inner end thereof. The second articulation is arranged similarly with respect to the second work unit. For transport, the work units are folded upwardly about their respective articulations, so as to extend vertically on either side of a driver's cabin of the motor vehicle. In this position, they are independent from one another. During work, the work units extend horizontally at the front of the motor vehicle and are rigidly connected to one another by the guidance means. This document specifies that the work units have a large working width to ensure that the machine has a good yield.

A drawback of the known machine consists in that with wide work units, the rigid connection between them does not allow good ground following when the units are in the work position. It is difficult for the pick-up rotors to follow the ground when the ground has a large number of depressions and bosses, so that the raking tools tend to scrape the ground and soil the picked up products with earth.

Another pick-up device is known from the document EP 0 715 804 A1. This describes a machine for processing products lying on the ground. This machine comprises a frame designed to be hitched to a tractor. When viewed in the direction of advance, each side of the frame is connected to a pick-up device by an articulation. Each pick-up device comprises a device for displacing the picked up products. Each pick-up device also comprises a first work unit and a second work unit. The first work unit is connected to the frame via a first articulation in the vicinity of its inner end and is supported at its end remote from the first articulation by a wheel. The second work unit is connected to the first work unit via a second articulation and is supported by a wheel at some distance from the second articulation. The second articulation is arranged between the two work units, and is directed in the direction of advance. Thus, the second work unit can pivot relative to the first in a plane that is vertical and perpendicular to the direction of advance.

A drawback of this machine is that the first work unit cannot pivot freely relative to the frame to follow the unevennesses of the ground, as it undergoes the movements of the second work unit with which it is articulated. Consequently, the first work unit cannot properly follow an uneven ground, so that the raking tools thereof scratch the soil and soil the picked up products with earth. Moreover, since the two work units are connected to one another by a shared articulation, the second work unit exerts a load on the first unit and this load is entirely borne by the first work unit. As a result, the moment of inertia of the first work unit about the first articulation is high. This causes faster mechanical fatigue of the pick-up device.

The object of the present invention is to provide a pick-up device that does not have the aforementioned drawbacks. The pick-up device according to the invention offers a large working width and a good pick-up quality via two work units which during work can pivot freely with respect to one another within a range defined by two end positions, and the inner ends of the work units remain at a small distance from one another and substantially at the same height with respect to one another.

To this end, an important feature of the invention consists in the fact that the third axis of the first pick-up rotor and the first axis of the first work unit are substantially in a same seventh plane, that the fourth axis of the second pick-up rotor and the second axis of the second work unit are substantially in a same eighth plane, that at least one stop means defines two work end positions of the first and second work units relative to the frame, between which the first and second work units are can pivot freely within a limited range about their respective first and second articulations with the frame, and that the first and second work units remain connected to one another via the guidance means regardless of their position between the work end positions.

A small gap is maintained between the pick-up rotors regardless of the relative pivoting of the work units, because the axis of rotation of each rotor is substantially in a plane passing through the articulation axis of the corresponding work unit carrying this rotor. This feature, together with the fact that the work units can pivot freely relative to the frame, enables the pick-up rotors to follow the unevennesses of the ground, resulting in high quality raking. In addition, the maintenance of this limited space in the work end positions is guaranteed by the stop means, which limits the pivoting angle of the work units. According to the invention, the displacement devices for moving the picked up products may for example be driven in the same direction, to make a swath on only one side of the pick-up device. In this case, it is desirable for the adjacent ends of the displacement devices to be substantially at the same height regardless of the relative pivoting of the work units about their articulations between the work end positions. This objective is achieved by the guidance means. It also allows the inner ends of the pick-up rotors to remain substantially at the same height. The invention thus enables a continuous strip of forage to be picked up and moved smoothly, without the risk of jammings or bundle formation.

According to an advantageous feature of the invention, each work unit extends between two planes, both of which are substantially vertical and substantially parallel to the direction of advance, and the axis of at least one of the first and second articulations is located substantially midway between the planes. Accordingly, the pressure applied to the ground by the corresponding work unit is substantially equal on either side of the articulation. Thus, the raking tools pick up the products lying on the ground with the same efficiency on both sides of the articulation and do not soil the picked up products with earth.

Other features and advantages of the invention will become apparent from the following description with reference to the attached drawings which show, in the manner of non-limiting examples, several embodiments of the pick-up device according to the invention.

Figure 1:
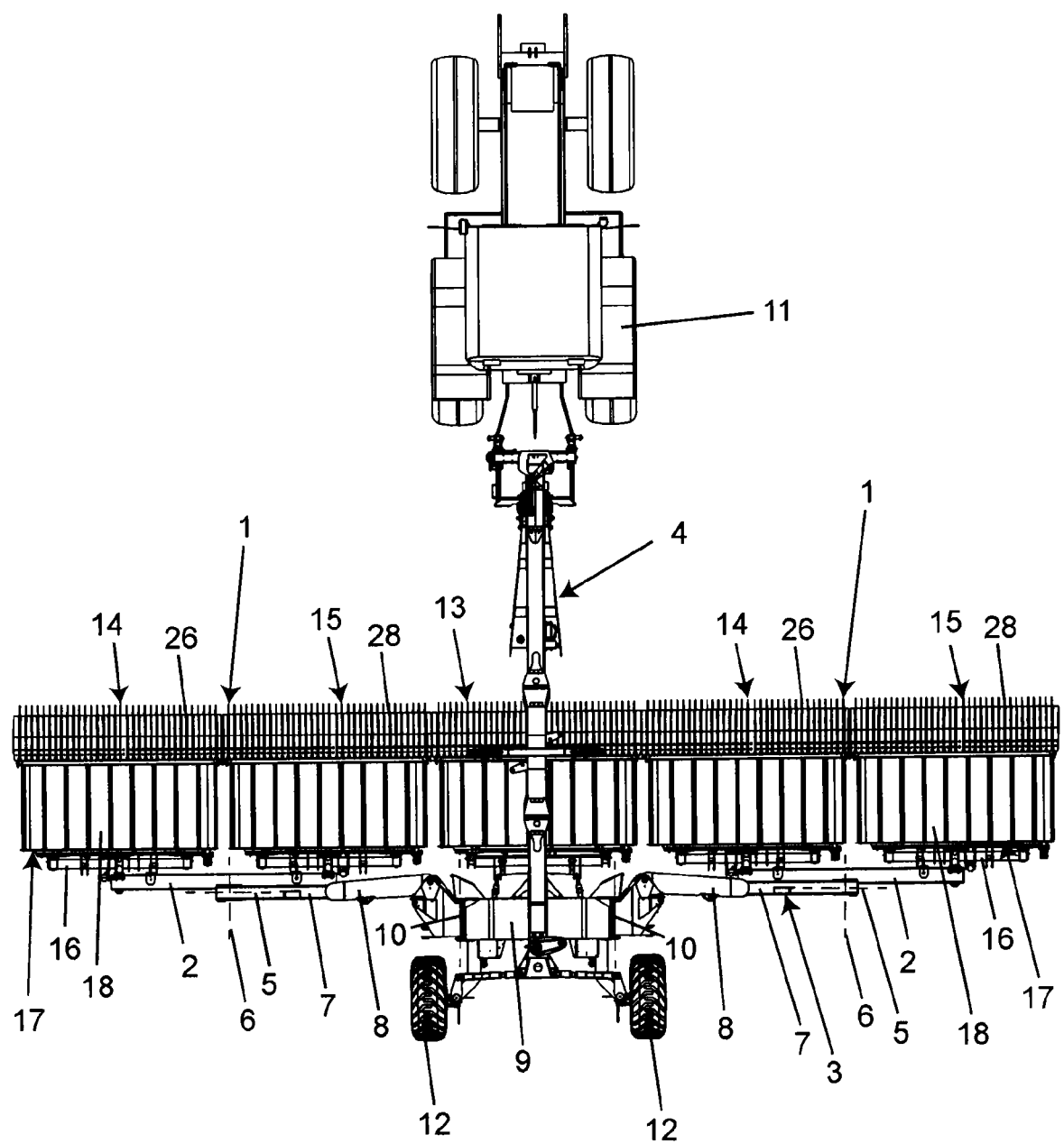
FIG. 1 shows a top view of a pick-up device according to the invention as part of an agricultural machine hitched to a tractor.

As shown in FIG. 1, the pick-up device (1) according to the invention comprises a rigid frame (2). In the exemplary embodiment shown, the frame (2) is connected in its rear part to the support framework (3) of an agricultural machine (4), particularly a harvesting machine, via on one hand an articulation (5) extending in a direction substantially horizontal and perpendicular to the direction of advance (A), on another hand via an articulation (6) extending in a direction substantially horizontal and perpendicular to the direction of advance (A). The left, right, front and rear are defined relative to the direction of advance (A). The support framework (3) comprises at least one support (7), at least one arm (8) and a machine frame (9). The support (7) is connected to the frame (2) by the articulations (5, 6) and to the arm (8) in rigid or sliding manner. The arm (8) is connected to the frame (9) by an articulation (10) extending substantially in the direction of advance (A). The arm (8) can be moved between at least two positions. In the work position, the pick-up device (1) extends laterally to the frame (9) and substantially horizontally. In the transport position, the pick-up device (1) is raised substantially vertically. The frame (9) is designed to be hitched to a tractor (11) and has wheels (12) in its rear portion that are in contact with the ground. The agricultural machine (4) preferably comprises at least two pick-up devices (1) according to the invention, which extend in front of the wheels (12) and are each connected to one side of the frame (9) via the arm (8). During work, the pick-up devices (1) according to the invention may then be arranged one beside the other in the direction of advance (A), and at a small distance from one another. Alternatively, the agricultural machine (4) shown in FIG. 1 comprises two pick-up devices (1) according to the invention that are located at some distance from one another so as to cooperate with a third pick-up device (13) connected to the support framework (3). This third pick-up device (13) may differ from the other two. The pick-up device (1) according to the invention may also be mounted on a support framework (3) of an agricultural machine (4) that does not have wheels in contact with the ground. In this case, the support framework (3) is designed to be attached to the three point hitching device of the tractor (11). The support framework (3) may also consist of the connection means to the three-point hitching device of the tractor (11). Thus, the pick-up device (1) according to the invention may be mounted not only on the rear of the tractor (11), but also on the front. When mounted on the front of the tractor (11), the pick-up device (1) may cooperate with another pick-up device, according to the present invention or not, located at the rear of the tractor (11). For example, the pick-up device (1) at the front picks up the products lying on the ground before the tractor (11) and moves them to one side of the tractor (11). The products deposited in this way are picked up again by the pick-up device (1) at the rear.

The first work unit (14) and the second work unit (15) each comprise a carrier structure (16) and a displacement device (17) for the picked up products. Each displacement device (17) preferably comprises a conveyor belt (18) which gathers the picked up products to move them laterally in a direction substantially perpendicular to the direction of advance (A). The conveyor belt (18) preferably stretches between two cylinders that are articulated to the carrier structure (16) by means of axes directed substantially in the direction of advance (A). At least one of the cylinders is set in motion by a motor. The displacement devices (17) may be for example driven in the same direction to displace the picked up products toward only one side of the pick-up device (1). Alternatively, they may be driven in opposite directions so as to deposit the picked up products on either side of the pick-up device (1). Finally, they may converge one to the other so as to deposit the picked up products inwardly, for example at the center, so that they may be picked up subsequently by another pick-up device.

Figure 5:
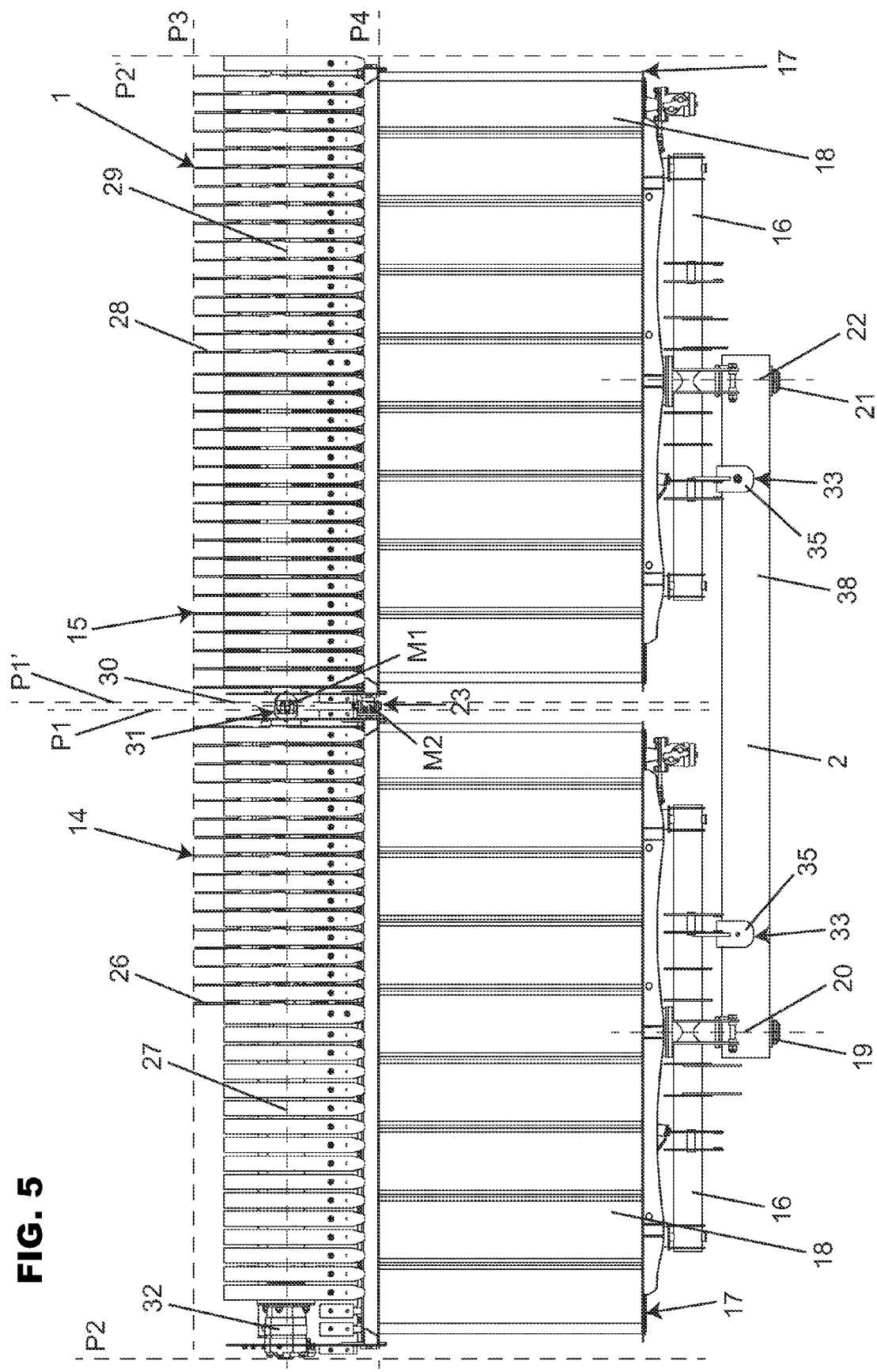
FIG. 5 shows a top view of a pick-up device according to the invention with some partial sections.

As is shown in FIG. 5, the first and second work units (14, 15) are arranged one beside the other when viewed in the direction of advance (A) and at a small distance from one another in a direction substantially perpendicular to the direction of advance (A). The first work unit (14) is connected directly to the frame (2) by a first articulation (19) having a first axis (20) directed substantially in the direction of advance (A). The second work unit (15) is connected directly to the frame (2) by a second articulation (21) having a second axis (22) directed substantially in the direction of advance (A). The direct connection of each work unit (14, 15) to the frame (2) prevents any possibility for at least one of the work units (14, 15) from being connected to the frame (2) via another element such as an articulated arm for example. The first axis (20) and second axis (22) are distinct. Thus, the first and second work units (14, 15) may pivot with respect to one another and with respect to the frame (2) in a plane that is substantially vertical and substantially perpendicular to the direction of advance (A). In addition, each of the work units (14, 15) is supported by its own articulation joint (19, 21) with the frame (2). As a result of this arrangement, the mechanical strength of the pick-up device (1) is increased, the ground following is improved and the quality raking is increased.

The first work unit (14) comprises a first pick-up rotor (26) which is can rotate about a third axis (27). The second work unit (15) comprises a second pick-up rotor (28) which can rotate about a fourth axis (29). Each pick-up rotor (26, 28) particularly comprises a cylinder articulated at each of its ends to the carrier structure (16) so as to be able to rotate about the corresponding axis (27, 29), which is preferably oriented substantially perpendicularly to the direction of advance (A). Each pick-up rotor (26, 28) also comprises teeth, which may be controlled or not, which pick up the products on the ground, lift them and project them in a direction opposite to the direction of advance (A). Each displacement device (17) is located immediately behind the corresponding pick-up rotor (26, 28) and receives the products picked up and projected backwards by the latter.

Figure 4:
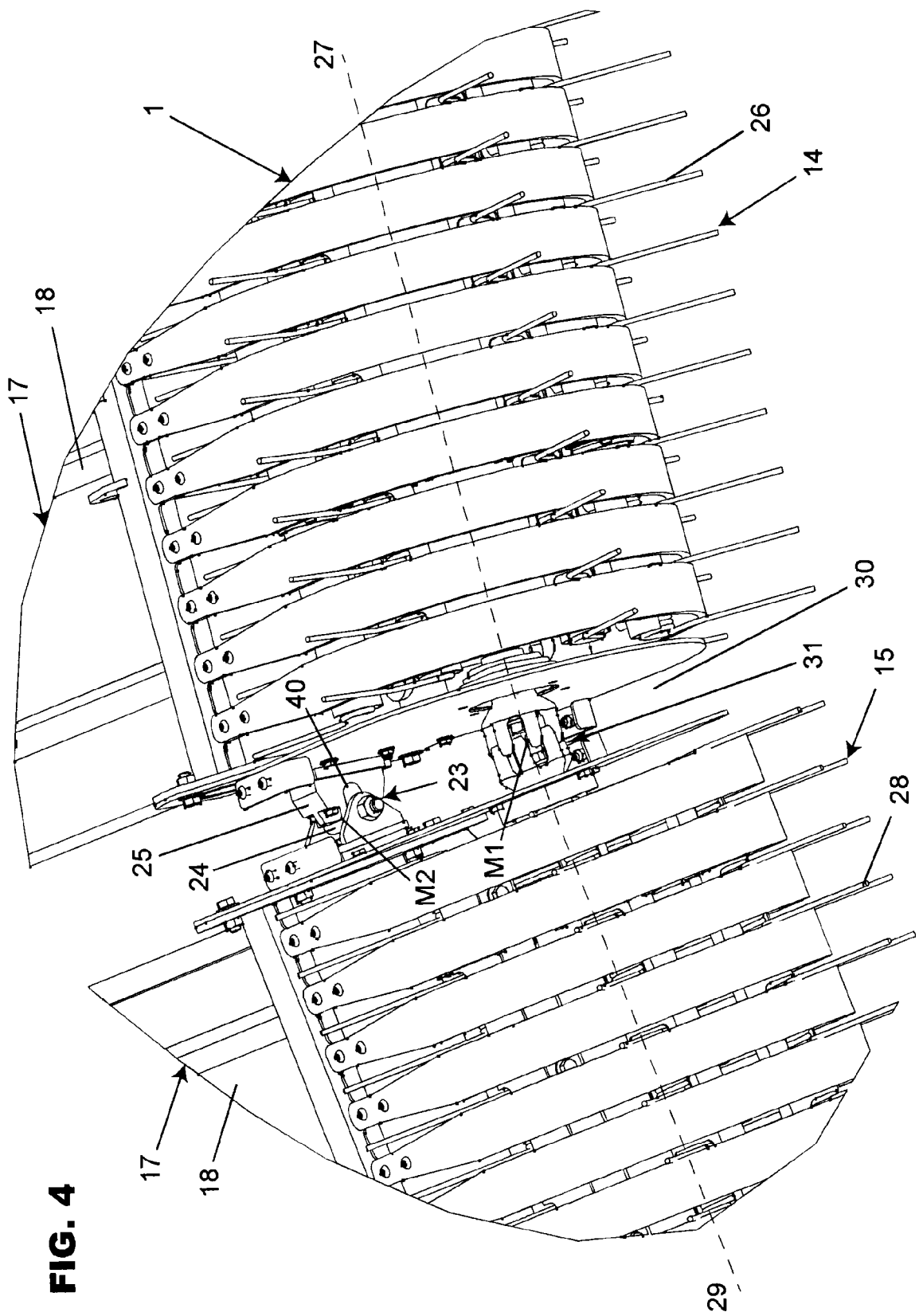
FIG. 4 shows a partial perspective view of a pick-up device according to the invention.

The first and second work units (14, 15) are interconnected by a guidance means (23), which is shown particularly in FIG. 4. When unevennesses in the ground cause the work units (14, 15) to pivot about their respective articulations (19, 21), their inner ends are kept at substantially the same height by the guidance means (23). This feature is particularly advantageous when the displacement devices (17) are driven in the same direction to form a swath on only one side of the pick-up device (1). The picked up products are moved smoothly from one displacement device (17) to the other, which eliminates the risk of jamming or loss of products between the two displacement devices (17). The formation of bundles in the displaced products is thus avoided, so the formed swath is more uniform. The guidance means (23) also allows the inner ends of pick-up rotors (26, 28) to remain substantially at the same height. Thus, the pick-up rotors (26, 28) form a continuous unit. The risk that some products may not be picked up towards the middle of the machine (4) due to a vertical offset of the pick-up rotors (26, 28) is therefore eliminated.

As may be seen in FIG. 5, the first work unit (14) extends between a first plane (P1) and a second plane (P2), which are substantially parallel to the direction of advance (A). The second work unit (15) extends between a third plane (P1') and a fourth plane (P2'), which are substantially parallel to the direction of advance (A). The first axis (20) preferably lies between the first and second planes (P1, P2) while the second axis (22) lies between the third and fourth planes (P1', P2'). It is more advantageous if at least one of the first and second axes (20, 22) lies substantially halfway between the first and second planes (P1) and (P2), respectively the third and fourth planes (P1') and (P2'). As a result, the pressure exerted on the ground by the corresponding work unit (14, 15) is substantially equal on both sides of the corresponding articulation (19, 21). Thus, the raking tools pick up the products lying on the ground with the same efficiency on both sides of the articulation (19, 21) and do not soil the picked up products with earth. The attached figures show the case in which the first and second axes (20) and (22) are located substantially halfway between the first and second planes (P1) and (P2), respectively the third and fourth planes (P1') and (P2'). The two work units (14, 15) are thus able to perform their raking function with outstanding efficiency.

According to a preferred embodiment shown in FIG. 4, the guidance means (23) comprises a finger (24) and a guide (25). The guide (25) is rigidly fastened to the first work unit (14), whereas the pin (24) is rigidly fastened to the second work unit (15). The guide (25) is provided with an opening (40) designed to accommodate the finger (24). The opening (40) has an elongated shape, the dimension of which is significantly greater in a direction substantially horizontal and perpendicular to the direction of advance (A) than a dimension of the finger (24) in the same direction. Thus, the finger (24) can move freely in the opening (40) in a direction substantially horizontal and perpendicular to the direction of advance (A). In a substantially vertical direction, the opening (40) has a dimension which is equal to or slightly larger than that a dimension of the finger (24). Accordingly, the finger (24) can pivot freely in the opening (40) about an axis oriented substantially in the direction of advance (A), and cannot move vertically in the opening (40). In addition, the guidance means (23) may also be designed to give the work units (14, 15) a freedom of movement with respect to one another in a direction substantially horizontal and parallel to the direction of advance (A).

As shown in FIG. 4, the opening (40) may have a U-shape, in which the finger (24), formed by a cylinder with an axis oriented substantially in the direction of advance (A), may move when the first and second work units (14, 15) pivot with respect to one another. Alternatively, according to a variant not shown, the guide (25) may consist of a bore oriented in a direction substantially perpendicular to the direction of advance (A). The finger (24), which is formed by a rod with a spherical end adapted to the diameter of the bore, is inserted in the bore.

The first pick-up rotor (26) and THE second pick-up rotor (28) are preferably arranged one beside the other when viewed in the direction of advance (A), and at a small distance from one another in a direction substantially perpendicular to the direction of advance (A). The products are thus picked up over the entire working width of the pick-up device (1) with no non picked up products remaining between the pick-up rotors (26, 28). In addition, the risk of products accumulating between the pick-up rotors (26, 28) is reduced. The combination of a small distance between the rotors (26, 28) and maintenance of their inner ends substantially at the same height via the guidance means (23) provides a continuous and uninterrupted pick-up assembly.

As is shown in FIG. 5, the first pick-up rotor (26) and the second pick-up rotor (28) are preferably separated by a space (30) in which the guidance means (23) is arranged. The space (30) is provided to ensure that the pick-up rotors (26, 28) are able to pivot one with respect to the other without colliding with one another. The width of the space (30) is preferably as small as possible so as not to increase the overall width of the pick-up device (1) excessively. Such an arrangement of the guidance means (23) in the space (30) is advantageous because it does not increase the overall size of the pick-up device (1).

The pick-up rotors (26, 28) extend between a fifth plane (P3) and a sixth plane (P4), which are both substantially vertical and substantially perpendicular to the direction of advance (A). The fifth and sixth planes (P3) and (P4) are shown in FIG. 5. The guidance means (23) is arranged not only in the space (30), as described above, but is in addition preferably arranged between the fifth and sixth planes (P3) and (P4). It has to be recalled that the work units (14, 15) are connected to the frame (2) via the corresponding articulation (19, 21) at their rear parts. Consequently the forward extension of the work unit (14, 15) is a source of elastic deformation of the corresponding articulation (19, 21). Since each articulation (19, 21) tends to deform, the farther forward the guidance means (23) is located, the more effectively the inner ends of the pick-up rotors (26, 28) will be kept at the same height. According to this rule, an advantageous arrangement of the guidance means (23) is thus between the fifth and sixth planes (P3) and (P4).

Figure 2:
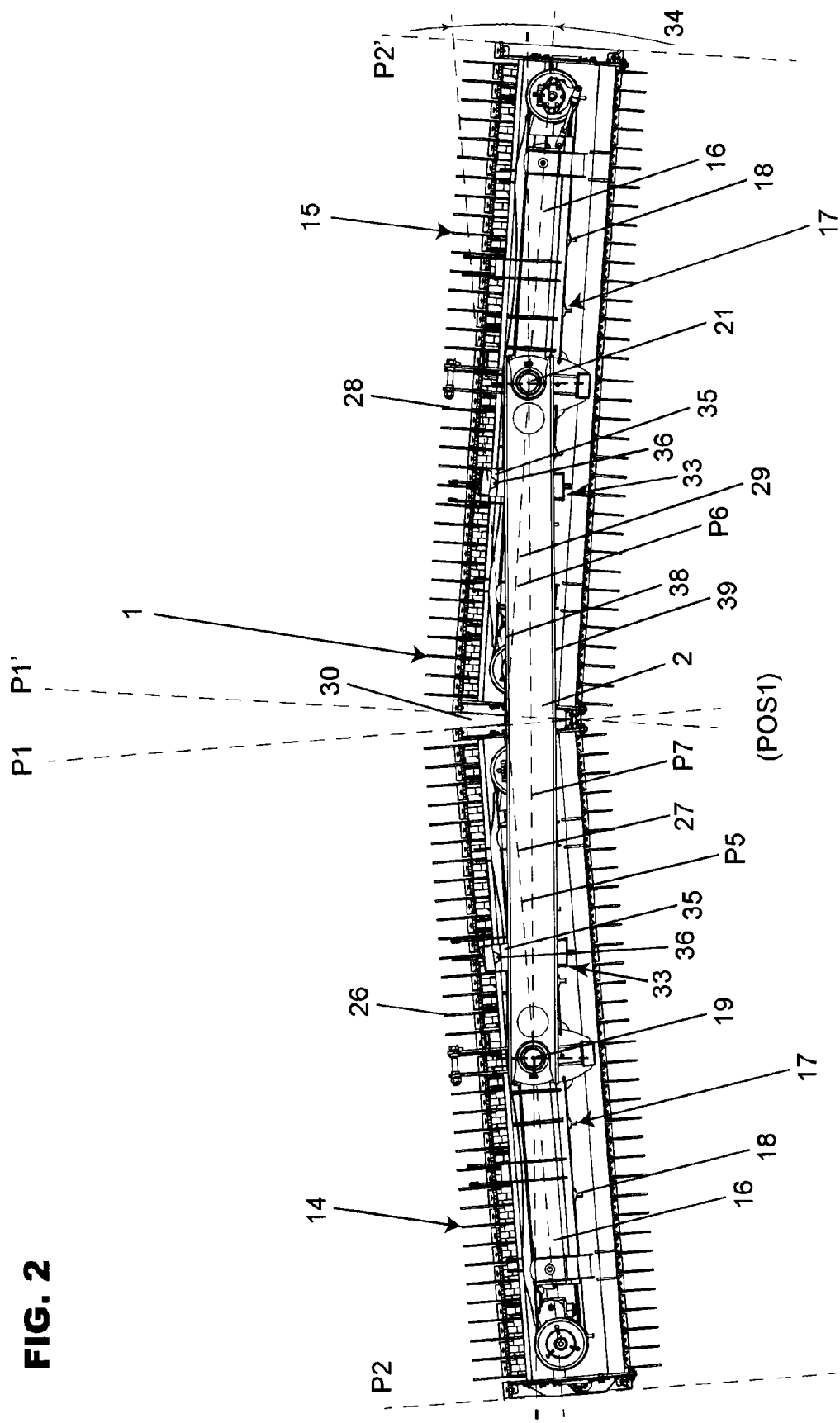
FIG. 2 shows a rear view of a pick-up device according to the invention in a first work end position.
Figure 3:
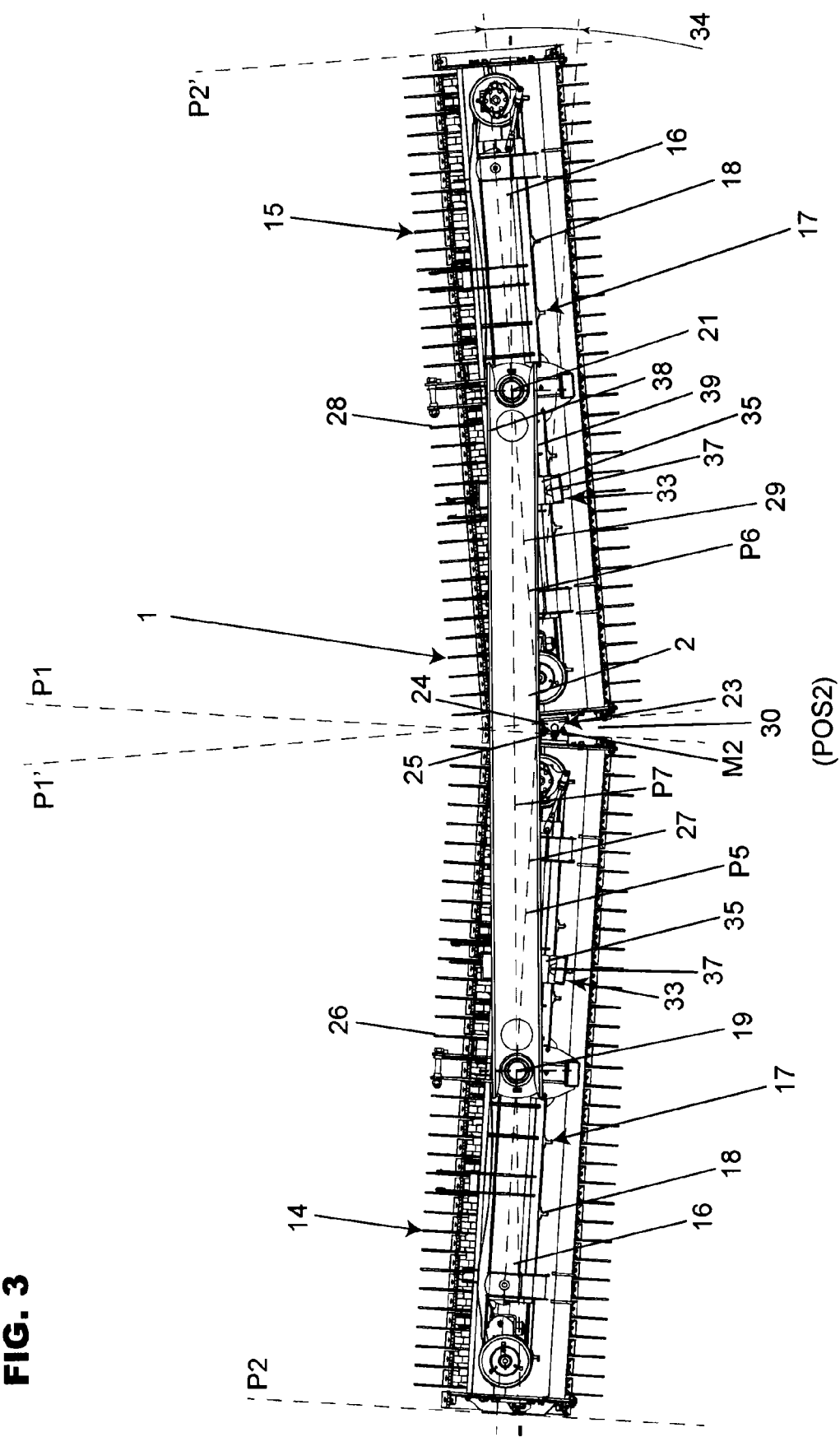
FIG. 3 shows a rear view of a pick-up device according to the invention in a second work end position.

The third axis (27) and the first axis (20) are substantially in a same seventh plane (P5). The fourth axis (29) and the second axis (22) are substantially in a same eighth plane (P6). The seventh and eighth planes (P5) and (P6) are shown in FIGS. 2 and 3. The aforementioned feature advantageously enables the space (30) to be kept small regardless of the pivoting of the pick-up rotors (26, 28) with respect to one another. Otherwise, as is known from the prior art, the third axis (27) and the first axis (20) as well as the fourth axis (29) and the second axis (22) are in different planes, with the result that the pick-up rotors (26, 28) may be close from one another when both of them are substantially horizontal, but significantly move away from one another when they pivot about their respective articulations (19, 21). Therefore, such an arrangement does not allow to get a continuous and uninterrupted pick-up assembly.

A stop means (33) defines two work end positions (POS1, POS2) of the first and second work units (14, 15) with respect to the frame (2) between which the first and second work units (14, 15) can pivot freely within a limited range about their respective first and second articulations (19, 21) with the frame (2), and the first and second work units (14, 15) remain connected to one another via the guidance means (23), regardless of their position between the work end positions (POS1, POS2). The end position (POS1) is shown in FIG. 2, while the end position (POS2) is shown in FIG. 3. The stop means (33) thus enables the work units (14, 15) to pivot through a wide enough angle to follow the contours of the land effectively and guarantees that the space between the work units (14, 15) remains small in their work end positions (POS1, POS2).

Preferably, regardless of the position of the first and second work units (14, 15) between the work end positions (POS 1 POS2), the guidance means (23) connects the first and second work units (14, 15) to one another at least in a substantially vertical direction and allows them to move freely with respect to one another in a direction that is substantially horizontal and perpendicular to the direction of advance (A).

Preferably, the rod (24) is thus engaged in the guide (25) regardless of the position of each work unit (14, 15) between the work end positions (POS1, POS2). In other words, all the advantages offered by the guidance means (23) apply regardless of the pivoting angle of the work units (14, 15).

Between the two work end positions (POS1, POS2), the first or the second work unit (14, 15) can pivot through a pivoting angle (34) about the corresponding first or second articulation (19, 21).

The stop means (33) may have the same form as an exemplary embodiment illustrated in FIGS. 2, 3, 5 and 8, wherein the stop means (33) is a part of the guidance means (23). In this exemplary embodiment, the stop means (33) comprises a first section connected to the frame (2), and a second section (35) with two supports (36, 37) that is connected to the work unit (14, 15), and wherein each work end position (POS1), respectively (POS2) is defined by the contact of one, respectively the other support (36, 37) with the first section. In this exemplary embodiment, a single stop means (33) might be provided in combination with one or the other work unit (14, 15). In the previously mentioned figures, a stop means (33) is associated with each work unit (14, 15). As is shown clearly in FIG. 8, the second section (35) has a U-shape which is rigidly fastened to the carrier structure (16) of the corresponding work unit (14, 15). The supports (36, 37) are made for example from elastic buffers, the support (36) being supported by the upper leg of the U, while the support (37) is supported by the lower leg of the U. When the work unit (14, 15) pivots to reach the work end position (POS1), the elastic buffer (36) moves closer to the upper surface (38) of the frame (2). When the elastic buffer (36) is in contact with the upper surface (38) and cannot be compressed further, the work end position (POS1) is reached. Similarly, when the work unit (14, 15) pivots to reach the work end position (POS2), the elastic buffer (37) moves closer to the lower surface (39) of the frame (2). When the elastic buffer (37) is in contact with the lower surface (39) and cannot be compressed further, the work end position (POS2) is reached.

Figure 9:
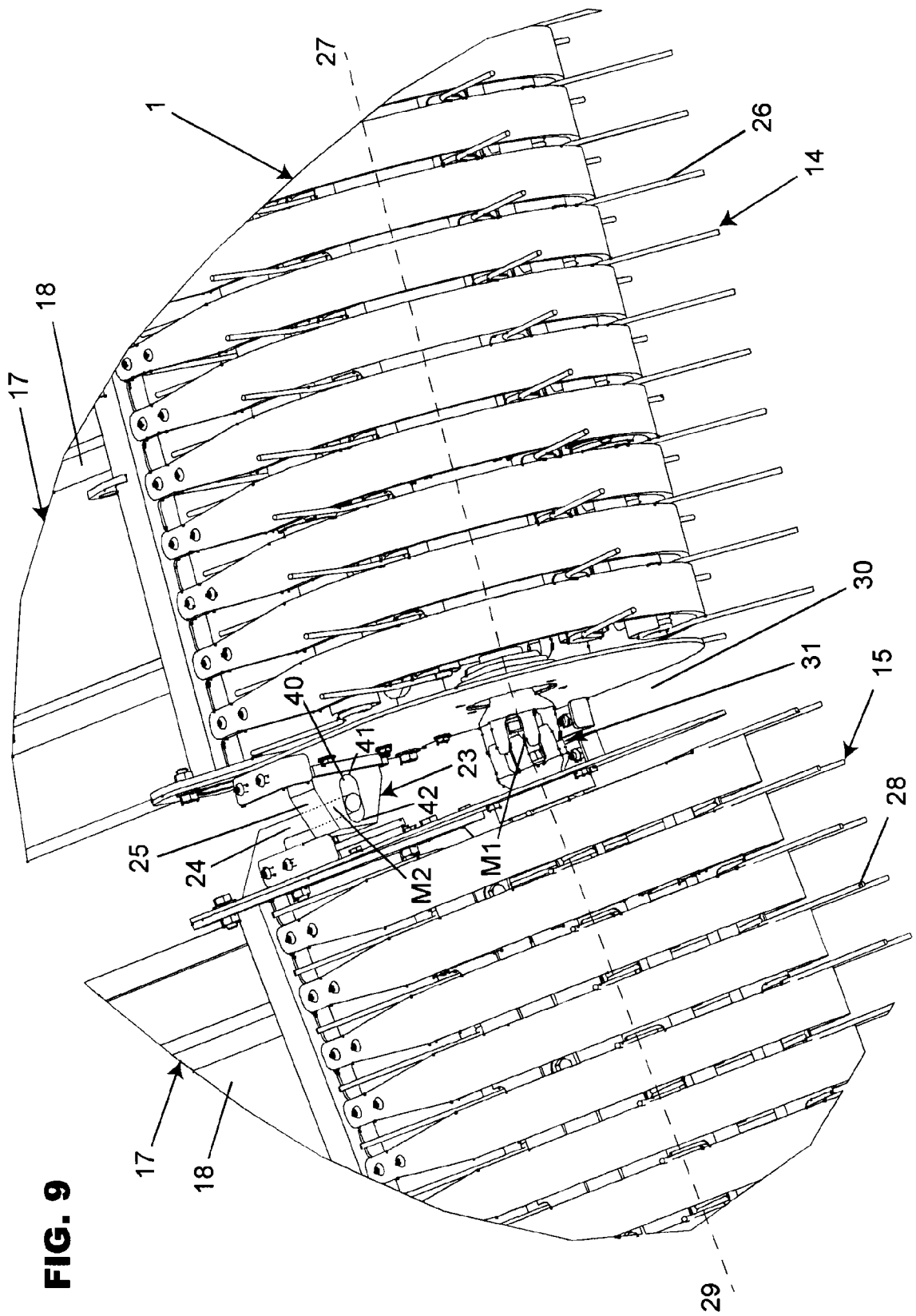
FIG. 9 shows another exemplary embodiment of the stop means.

The stop means (33) may assume a different exemplary embodiment as shown in FIG. 9, in which the opening (40) of the guide (25) has an oblong shape with two ends (41, 42). The stop means (33) is then formed by the finger (24) and the ends (41, 42). When the finger (24) comes into contact with one of the ends (41, 42), the work units are in one of the work end positions (POS1, POS2). When the finger (24) comes into contact with the other end (41, 42), the work units are in the other work end position.

The stop means (33) is preferably designed such that the pivoting angle (34) between the work end positions (POS1, POS2) is less than or equal to 20°. This value allows good ground following.

As is shown in FIG. 4, the first pick-up rotor (26) and the second pick-up rotor (28) are mutually driven in rotation via a coupling (31).

The said coupling (31) is preferably a finger coupling. Such a coupling (31) consists of two sets of fingers, one left and one right, arranged in a circle, which engage with each other. Each set is rigidly connected to the inner end of a pick-up rotor (26, 28). Each set may easily be separated from the other, which makes the mounting and replacement of the finger coupling (31) easier. This also serves to reduce the size of the latter. Consequently, the finger coupling (31) helps to keep the width of the space (30) small. The finger coupling (31) is advantageously surrounded by a bellows, which retains the grease for lubrication and reduces infiltration of impurities.

Figure 6:
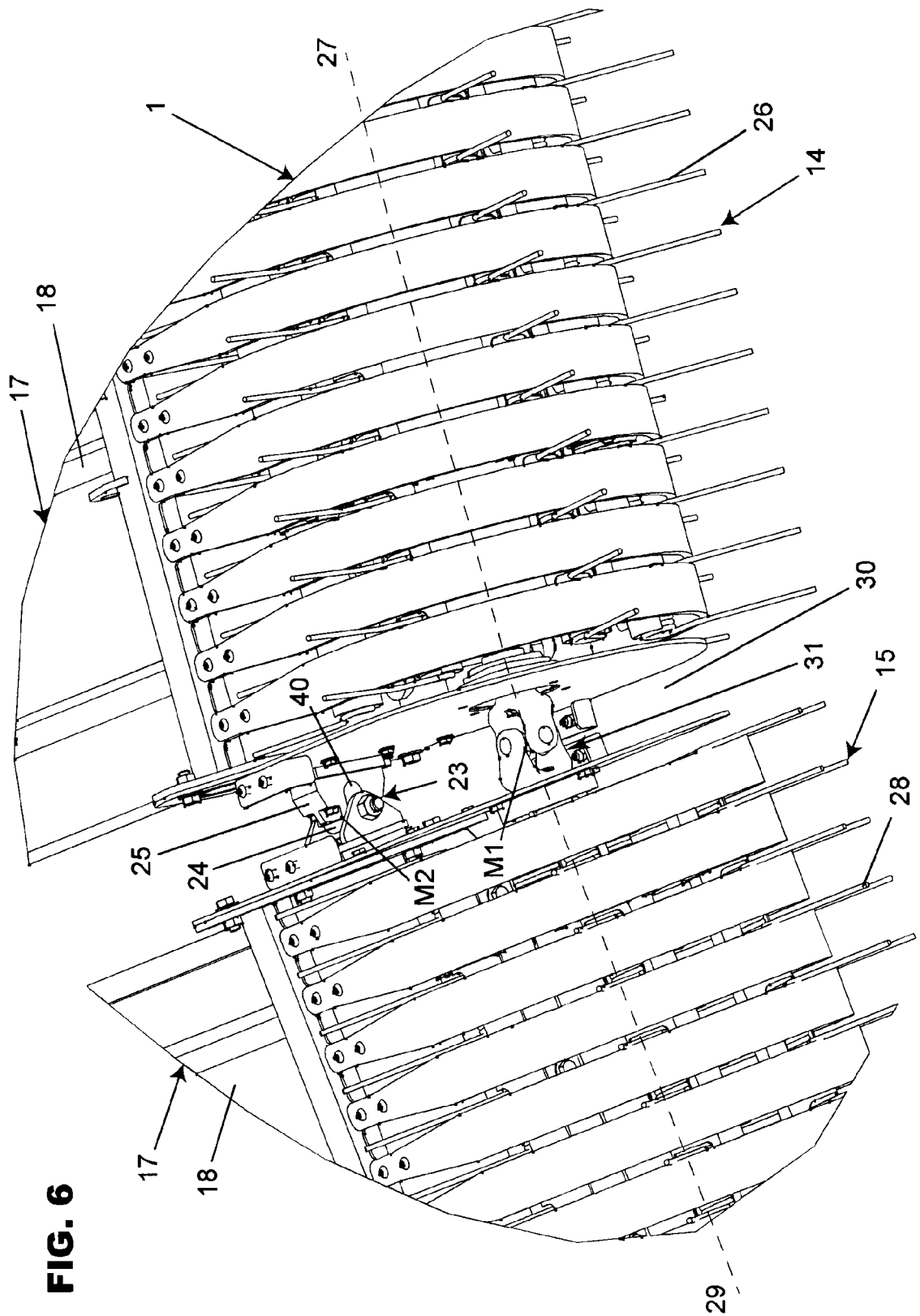
FIG. 6 shows a partial perspective view of a pick-up device according to the invention.

A variant shown in FIG. 6 provides that the first pick-up rotor (26) and the second pick-up rotor (28) are mutually driven in rotation by a cardan coupling (31). Such a coupling (31) comprises a left assembly and a right assembly in the form of jaws in known manner. Each assembly is mounted slidably relative to the inner end of the corresponding pick-up rotor (26, 28).

Figure 7:
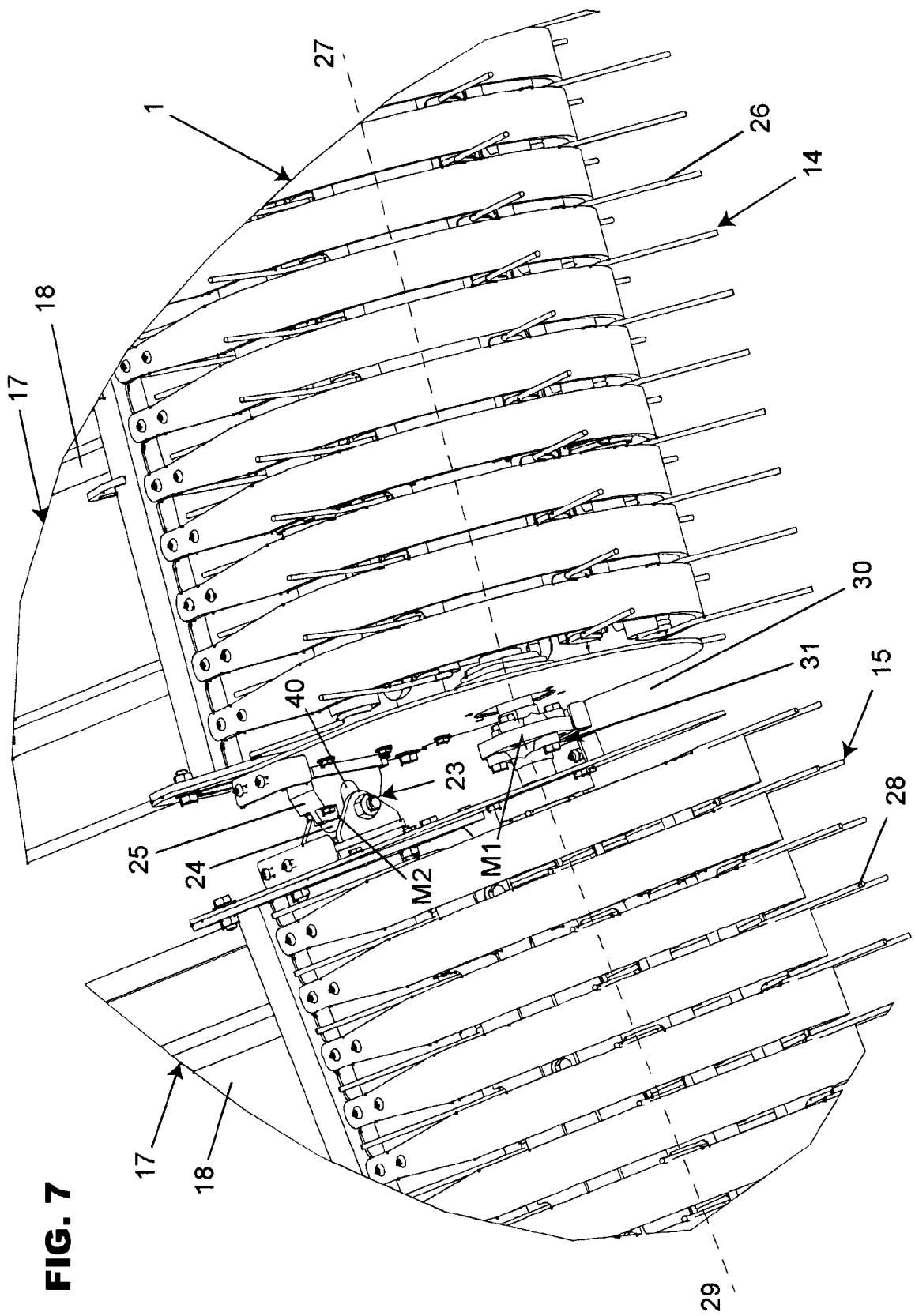
FIG. 7 shows a partial perspective view of a variant of a pick-up device according to the invention.
Figure 8:
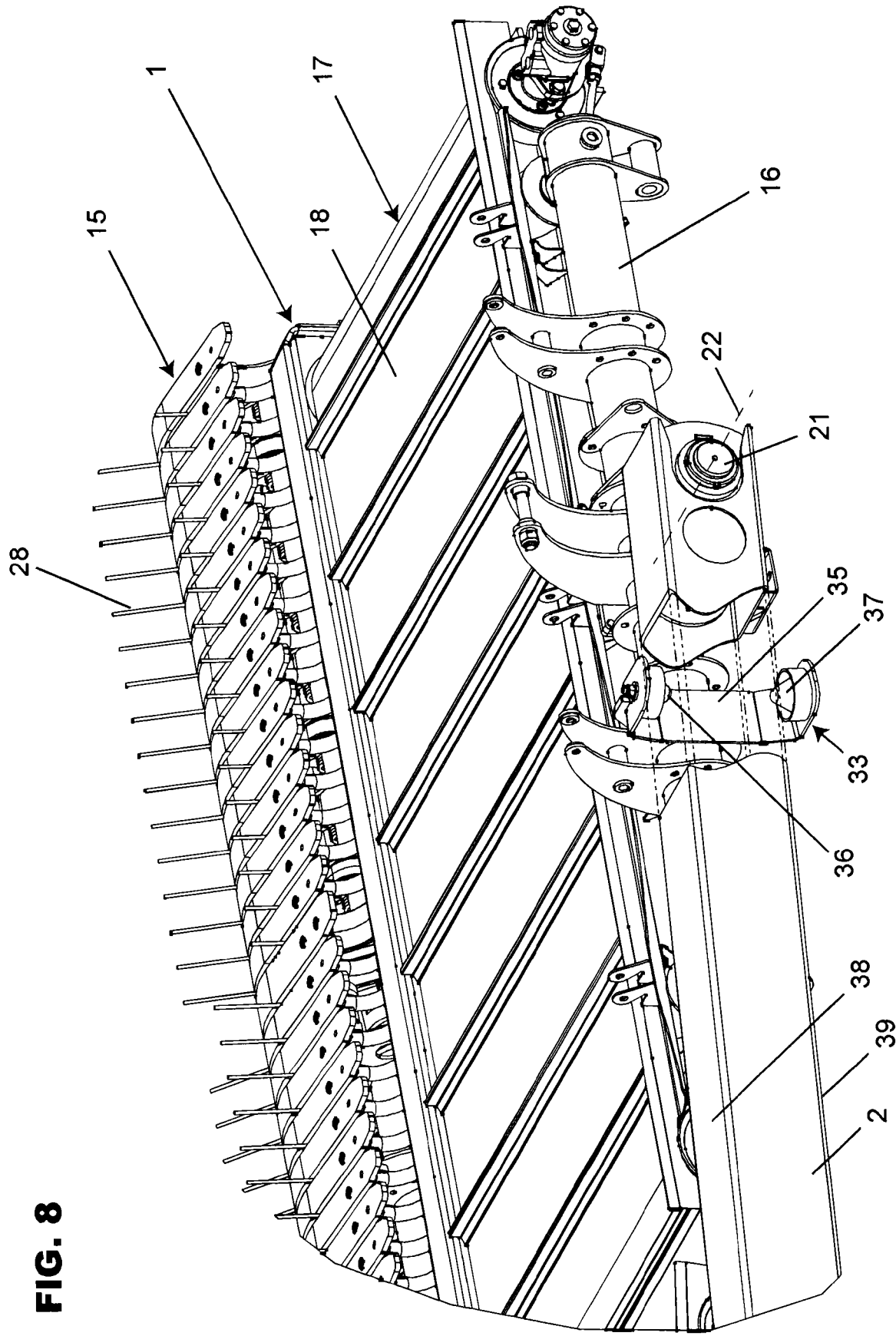
FIG. 8 shows an exemplary embodiment of the stop means.

In another variant, shown in FIG. 7, the first pick-up rotor (26) and the second pick-up rotor (28) are mutually driven in rotation by an elastic coupling (31). The elastic coupling (31) may consist of a cylindrical element made from a flexible synthetic material, rubber for example, positioned between a left and a right assembly, for example flanges. Each assembly is rigidly fastened to an inner end of a pick-up rotor (26, 28).

As is shown particularly in FIG. 4, the coupling (31) comprises a first centre (M1) and the third axis (27) of the first pick-up rotor (26) as well as the fourth axis (29) of the second pick-up rotor (28) preferably pass substantially through the first centre (M1).

The guidance means (23) is preferably arranged close to the coupling (31). This feature is shown in FIG. 4. In this case, the guidance means (23) advantageously absorbs a large part of the forces exerted vertically by the left assembly on the right assembly of the coupling (31), and vice versa. In this way, the guidance means (23) helps to increase the operating life of the coupling (31).

The first axis (20) and the second axis (22) are preferably substantially in a same ninth plane (P7), which is shown in FIGS. 2 and 3. The guidance means (23) comprises a second centre (M2). The first centre (M1) and the second centre (M2) form a segment of a straight line that is preferably substantially parallel to the ninth plane (P7). In the work position, the ninth plane (P7) is preferably substantially horizontal, which means that, during work, the first centre (M1) and the second centre (M2) are substantially at the same distance from the ground.

A drive means (32) preferably drives the first pick-up rotor (26) in rotation, while the second pick-up rotor (28) is driven in rotation by transmission of the rotating motion from the first pick-up rotor (26) to the second pick-up rotor (28) via the coupling (31). The drive means (32) may comprise an electric or hydraulic motor located close to the outer end of the first pick-up rotor (26). The motor is preferably housed inside the first pick-up rotor (26), as shown in FIG. 5. This advantageous arrangement does not increase the overall width of the pick-up device (1). Alternatively, the drive means (32) may comprise a drive case with pinions, a belt or a chain, positioned close to the outer end of the first pick-up rotor (26). The drive case may be set in motion by an electric or hydraulic motor mounted on the pick-up device (1) or located outside of the latter, for example on the support framework (3). Finally, the drive means (32) may comprise a shaft connected to the first pick-up rotor (26) by a rotary coupling. The combination of the drive means (32) and the rotary coupling allows a single drive means (32) to be used to set the pick-up rotors (26, 28) in motion. This reduces the weight and cost of the pick-up device (1).

Each work unit (14, 15) preferably has a working width between seventy centimeters and four meters. The working width of each work unit (14, 15) is defined by the distance between the raking tool closest to the first plane (P1), respectively the third plane (P1'), and the raking tool closest to the second plane (P2), respectively the fourth plane (P2'). Up to a width of four meters, the work unit (14, 15) follows the contours of the ground satisfactorily. The pick-up device (1) according to the invention may thus reach a working width of about eight meters. This feature is advantageous for producing an agricultural machine (4) with a wide working width such as the one illustrated in FIG. 1. In this example, the agricultural machine (4) comprises two pick-up devices (1) according to the invention which extend laterally and have each a working width of close to five meters. The pick-up devices (1) cooperate with a third pick-up device in a middle position, the width of which is of about two meters. The agricultural machine (4) shown thus reaches a working width of almost twelve meters.

The agricultural machine (4) may also be a baler, a chopper or a loader wagon for example. On such a machine, the displacement device may comprise a supply rotor positioned for example rearwards of the pick-up rotor, which supply rotor may be provided with knives for cutting the picked up products into stalks of standardized length. The displacement device may also comprise one or more augers to move the product laterally from the pick-up rotor toward the supply rotor.

It is clear that the invention is not limited to the embodiments described above and illustrated in the attached figures. Modifications remain possible, particularly with regard to the constitution or number of the different elements, or by substitution of technical equivalents, without thereby departing from the scope of protection.

The invention claimed is:

1. A pick-up device, comprising:
    tools for raking and picking up products lying on the ground, configured to be mounted on a support framework of an agricultural machine;
    a rigid frame;
    a first work unit and a second work unit, each of the first and second work units comprising a displacement device for moving picked up products, the first and second work units being arranged one beside the other when viewed in a direction of advance and at a small distance from one another in a direction substantially perpendicular to the direction of advance, the first work unit being connected directly to the frame by a first articulation having a first axis extending substantially in the direction of advance, the second work unit being connected directly to the frame by a second articulation having a second axis extending substantially in the direction of advance and being distinct from the first axis, the first work unit comprising a first pick-up rotor which can rotate about a third axis, the second work unit comprising a second pick-up rotor which can rotate about a fourth axis, the first work unit and the second work unit being connected to one another by a guidance means,
    wherein the third axis and the first axis are substantially in a same plane, called a seventh plane,
    wherein the fourth axis and the second axis are substantially in a same other plane, called an eighth plane; and
    at least one stop means defining two work end positions of the first and second work units with respect to the frame, between which the first and second work units can pivot freely within a limited range about their respective first and second articulations with the frame,
    wherein the first and second work units remain connected to one another via the guidance means regardless of their position between the work end positions.

2. The pick-up device according to claim 1, wherein a first plane is defined as perpendicular to the third axis and passing by an extreme right end point of the first work unit according to the direction of advance, wherein a second plane is defined as perpendicular to the third axis and passing by an extreme left end point of the first work unit according to the direction of advance, wherein a third plane is defined as perpendicular to the fourth axis and passing by the extreme left end point of the second work unit according to the direction of advance, wherein a fourth plane is defined as perpendicular to the fourth axis and passing by the extreme right end point of the second work unit according to the direction of advance, wherein the first axis lies between the first plane and the second plane, wherein the second axis lies between the third plane and the fourth plane, and wherein at least one of the first and second axes lies substantially halfway of the first plane and the second plane, respectively the third plane and the fourth plane.

3. The pick-up device according to claim 1, wherein the guidance means connects the first and second work units with one another at least in a substantially vertical direction and enables them to move freely relative to one another in a direction that is substantially horizontal and perpendicular to the direction of advance, regardless of a position of the first and second work units between the work end positions.

4. The pick-up device according to claim 1, wherein the guidance means comprises a finger that is rigidly fastened to the second work unit and a guide that is rigidly fastened to the first work unit and that includes an opening configured to receive the finger,
    wherein the opening has an elongated shape of which a dimension in a direction substantially horizontal and perpendicular to the direction of advance is substantially greater than a dimension of the finger in the same direction, and
    wherein the opening has a dimension equal to or slightly greater than a dimension of the finger in a substantially vertical direction.

5. The pick-up device according to claim 4, wherein the finger is engaged in the guide regardless of a position of the first work unit or the second work unit between the work end positions.

6. The pick-up device according to claim 1, wherein the stop means includes a first part connected to the frame and a second part with two supports, which second part is connected to the first and second work units, and wherein each work end position of the two work end positions is defined by contact of one, respectively the other support with the first part.

7. The pick-up device according to claim 4, wherein the opening has an oblong shape with two ends, and wherein the stop means is formed by the finger and the ends.

8. The pick-up device according to claim 3, wherein the first pick-up rotor and the second pick-up rotor are arranged one beside the other when viewed in the direction of advance, and at a small distance from one another in a direction substantially perpendicular to the direction of advance.

9. The pick-up device according to claim 3, wherein the first pick-up rotor and the second pick-up rotor are separated by a space, and wherein the guidance means is arranged in the space.

10. The pick-up device according to claim 9, wherein a fifth plane is defined as substantially vertical, substantially perpendicular to the direction of advance and passing by an extreme front end point of the first or second pick-up rotors, wherein a sixth plane is defined as substantially vertical, substantially perpendicular to the direction of advance and passing by a front edge of a conveyor belt, and wherein the guidance means is arranged between the fifth and sixth planes.

11. The pick-up device according to claim 1, wherein the first pick-up rotor and the second pick-up rotor are mutually driven in rotation by a coupling.

12. The pick-up device according to claim 11, wherein the coupling is a finger coupling.

13. The pick-up device according to claim 11, wherein the coupling is a cardan coupling.

14. The pick-up device according to claim 11, wherein the coupling is an elastic coupling.

15. The pick-up device according to claim 11, wherein the coupling comprises a first center, and wherein the third axis of the first pick-up rotor and the fourth axis of the second pick-up rotor pass substantially through the first center.

16. The pick-up device according to claim 11, wherein the guidance means is arranged close to the coupling.

17. The pick-up device according to claim 15, wherein the first axis and the second axis are substantially in a same ninth plane, wherein the guidance means comprises a second center, and wherein the first center and the second center form a segment of a straight line that is substantially parallel to the ninth plane.

18. The pick-up device according to claim 11, further comprising a drive means drives the first pick-up rotor in rotation, and wherein the second pick-up rotor is driven in rotation by transmission of rotating motion from the first pick-up rotor to the second pick-up rotor via the coupling.

19. The pick-up device according to claim 1, wherein the stop means is configured such that a pivoting angle of the first or second work units between the work end positions is less than or equal to 20°.

20. The pick-up device according to claim 1, wherein each work unit has a working width between seventy centimeters and four meters.

21. The pick-up device according to claim 1, wherein each displacement device comprises a conveyor belt that moves products laterally in a direction substantially perpendicular to the direction of advance.

22. An agricultural machine comprising at least one pick-up device according to claim 1.

* * * * *